(12) United States Patent
Meyer zu Hoberge et al.

(10) Patent No.: US 9,869,571 B2
(45) Date of Patent: Jan. 16, 2018

(54) DEVICE FOR DETECTING MASS PARTICLES AND METHOD FOR CONTROL

(71) Applicant: Mueller-Elektronik GmbH & Co. KG, Salzkotten (DE)

(72) Inventors: Sebastian Meyer zu Hoberge, Paderborn (DE); Martin Liebich, Breitenbach (DE); Ulrich Hilleringmann, Bad Wuennenberg (DE)

(73) Assignee: Mueller-Elektronik GmbH & Co. KG, Salzkotten (DE)

(*) Notice: Subject to any disclaimer, the term of this patent is extended or adjusted under 35 U.S.C. 154(b) by 372 days.

(21) Appl. No.: 14/519,936

(22) Filed: Oct. 21, 2014

(65) Prior Publication Data

US 2015/0112556 A1   Apr. 23, 2015

Related U.S. Application Data

(63) Continuation of application No. PCT/DE2013/000619, filed on Oct. 21, 2013.

(51) Int. Cl.
| | |
|---|---|
| *G01F 1/36* | (2006.01) |
| *A01C 21/00* | (2006.01) |
| *G01L 1/16* | (2006.01) |
| *A01C 7/10* | (2006.01) |

(52) U.S. Cl.
CPC .............. *G01F 1/363* (2013.01); *A01C 7/105* (2013.01); *A01C 21/005* (2013.01); *G01L 1/16* (2013.01)

(58) Field of Classification Search
None
See application file for complete search history.

(56) References Cited

U.S. PATENT DOCUMENTS

| | | | |
|---|---|---|---|
| 3,527,928 A | 9/1970 | Ryder et al. | |
| 3,989,311 A | * 11/1976 | Debrey | A47L 9/19 |
| | | | 111/903 |

(Continued)

FOREIGN PATENT DOCUMENTS

| | | |
|---|---|---|
| DE | 3310424 C2 | 9/1984 |
| DE | 10011581 A1 | 9/2000 |

(Continued)

OTHER PUBLICATIONS

International Search Report dated Oct. 8, 2014, International Application No. PCT/DE2013/000619.

(Continued)

*Primary Examiner* — Jermele M Hollington
*Assistant Examiner* — Suresh K Rajaputra
(74) *Attorney, Agent, or Firm* — Patent Central LLC; Stephan A. Pendorf (57) ABSTRACT

A device for detecting mass particles in air flows guided in a pipe, in particular of seeds to be distributed in a seed drill. A sensor element is disposed on the pipe. The sensor element is a piezoelectric element. An impact surface is disposed on the side of the piezoelectric element facing the interior of the pipe. A damping body is arranged on the side of the piezoelectric element facing away from the interior of the pipe. A rigid base body is disposed on the side of the piezoelectric element facing away from the interior of the pipe.

8 Claims, 4 Drawing Sheets

(56) References Cited

U.S. PATENT DOCUMENTS

| | | | |
|---|---|---|---|
| 4,193,010 A * | 3/1980 | Kompanek | G01F 23/2967 |
| | | | 310/321 |
| 4,646,941 A | 3/1987 | Grosse-Scharmann et al. | |
| 2012/0227647 A1 | 9/2012 | Gelinske | |
| 2015/0112556 A1 | 4/2015 | Meyer Zu Hoberge | |

FOREIGN PATENT DOCUMENTS

| | | |
|---|---|---|
| DE | 19946410 A1 | 4/2001 |
| DE | 10036304 A1 | 2/2002 |
| DE | 10350542 A1 | 6/2005 |
| DE | 102006038865 A1 | 2/2008 |
| DE | 102009051942 A1 | 5/2011 |
| EP | 0158985 A2 | 10/1985 |
| EP | 1341122 A1 | 9/2003 |
| WO | 2011054340 A1 | 5/2011 |
| WO | 2015058735 A1 | 4/2015 |

OTHER PUBLICATIONS

European Search Report dated Mar. 4, 2016, in corresponding European Application No. 15188517.5.

Office Action dated Mar. 2, 2016, in corresponding German Application No. 10 2014 115 020.1.

\* cited by examiner

DEVICE FOR DETECTING MASS PARTICLES AND METHOD FOR CONTROL

The invention relates to a device for detecting mass particles in pipe-guided air flows, in particular of seeds to be distributed with a seed drill, with a pipe through which the air stream containing the mass particles is guided, with a sensor element disposed on the pipe, wherein the sensor element is a piezoelectric element, an impact surface disposed on the side of the piezoelectric element facing the interior of the pipe, a damping body arranged on the side of the piezoelectric element facing away from the interior of the pipe, and a rigid base body disposed on the side of the piezoelectric element facing away from the interior of the pipe.

The invention further relates to a method for controlling the mass particles to be distributed in seed drills, wherein the mass particles are delivered by means of an air stream through a conduit to a distributing device and then branched to a plurality of distribution lines, wherein an actual output rate of the mass particles is detected by means of a sensor device and supplied ad sensor signals to a control device, in which a correcting variable is determined depending on a target application rate for application to a metering device, by means of which the actual application rate of the mass particles is adjusted.

Furthermore, the invention relates to a device for controlling the output of mass particles in a seed drill, with a pipe to convey the mass particles from a seed reservoir to a distributor, from which several distribution lines lead to seed drills or planting elements, with a metering device for adjusting an actual application rate of the mass particles, with a control device for determining a control variable for the metering device as a function of a desired spray rate.

DE 10 2004 004 730 A1 discloses a method for controlling mass particles to be distributed in a seed drill, in which the application rate during sowing is fixed during according to a previously performed calibration. If it is determined during the sowing process that the application rate has too great a deviation from the established calibration, a new calibration is required. This calibration is done while driving at reduced speed. A disadvantage of the known method is that no continuous control of the application rate is provided during the sowing process.

DE 10 2011 010 100 A1 discloses a method and apparatus for controlling mass particles to be distributed in a seed drill, in which a traveling speed of the drill is controlled in dependence on quality parameters. In the quality parameters there runs the detection of the individual mass particles as well as the operating state of the sowing aggregate. A disadvantage of the known method is that, for optimum sowing operation, the driver can have no influence on the driving speed.

DE 10 2006 038 865 A1 discloses a method for controlling mass particles to be distributed in a seed drill, in which an adaptive controller is used with a Fuzzy Logic block. By means of the adaptive controller, the rotational speed of a dosing device is controllable, whereby an actuating variable as a function of a desired application rate is determined. A disadvantage of the known method is that the control effort is relatively intense, values of several operating parameters are taken into account during the control process and several correcting variables of the drill must be controlled simultaneously. The different correcting variables will be thus change in complex manner depending on the actual values of multiple operating parameters to achieve the desired application rate.

The object of the present invention is to provide an apparatus for detecting mass particles in air currents propagated in pipes in such a way that in a simple manner an improved measurement result is achieved, in particular, wherein in particular differently shaped mass particles can be accurately counted, and wherein a sensor element can be easy to installed on the line.

To achieve the object, the device according to the invention is characterized, in connection with the preamble of claim 1, in that between a damping body and a rigid base body a contact disk is arranged with a first connecting element and a second connecting element arranged at a radial distance from the first connecting element, the damping body formed as a damping disc exhibiting electrical connecting elements spaced from each other in the radial direction, wherein a first connecting element electrically connects only the first connecting surface of the contact disk with a first connecting element of the piezo element, and on the other hand, a second connecting element of the damping plate electrically connects only the second connecting element of the contact disk to the second connecting element of the piezo element.

Advantageously the components of the sensor element can be assembled together with adjacent components of the sensor element in each case lie flush and/or planar against one another. A soldered connection of leads to the piezo element can be omitted, since against the piezo element a damping plate with electrical connecting elements and a contact disk with corresponding pads connect, wherein the contact disk is connected with a cable, which is led to the outside via a breakthrough in the rigid base body. The damping plate has a dual function. It serves on the one hand the impact stress of the piezoelectric element upon impact of mass particles on the impact surface. On the other hand the electrically conductive jointing elements of the damping plate ensure an electrical connection on the one hand of a first connecting surface of the piezoelectric element to a first connection surface of the contact disk and on the other hand a second connecting surface of the piezoelectric element to a second connecting surface of the contact disk.

According to a preferred embodiment of the invention the first connecting element of the first connecting element and contact disk the damping plate are circular. The second connecting element of the contact disk and the second connecting element of the damping plate preferably extend annularly or ring shaped. The connecting elements and the fastening elements of the damping plate or the contact disk preferably extend in a common plane, so that the sensor element has a compact structure.

Preferably, a radial clearance on the one hand between the first connector and the second connector of the damping plate and on the other hand the first connecting element and the second connecting element of the contact disk is designed to be so large that no short circuit can occur. Preferably, the first connector covers the first connecting element of the contact disk, whereby the maintenance of a sufficiently large radial distance from the second connecting element is assured. This ensures a reliable contact between the contact disk and the damping plate.

According to a refinement of the invention the sensor element is arranged in a deflection section of the pipe, wherein an upstream portion of the feed section tapers in the flow direction. The tapering ensures that all mass particles conveyed in the feed section impinge only once on an impact surface of the sensor element. The sensor element is touch-sensitive and beyond this is robust and insensitive to dirt. In the feed section there is a directional guidance of the air flow having the mass particles, so that all mass particles impinge on the impact surface, without the air flow causing mass particles to bypass the sensor element or impact plate. The increase in speed of the air flow associated with the taper the causes a targeted impact of the mass particles to the impact surface at a speed such that an unambiguous counting of the same is ensured. By increasing the speed, also those mass particles reach the impact surface which otherwise would not strike on the impact plate at the required pressure. If the mass particles are in the form of seeds, the invention enables high particle output rates in pneumatic seed drills, with which different seeds, such as rapeseed, wheat or corn, grain, be accurately counted. All counting objects or seeds touch the collision surface precisely once, whereby the fluid mechanics of the seed drill is only marginally impaired. Alternatively, the invention can also be used for seed flow monitoring, wherein jamming or blockages in the flow are detected.

According to a refinement of the invention the sensor element is arranged in a deflection section of the pipe. At an outer region of the deflection section a bore throat is engageable with a securing element by a screw connection such that in a locked position of the securing element the piezo element, the damping body and the impact plate are arranged compressed in a mounting position. The sensor element can advantageously be handled in the manner of a screw connection and positioned in a readily accessible outside of the deflection portion of the pipe, wherein as a result of the axial clamping force the sensor relevant components of the sensor element, namely the impact surface, the piezo element and the damping body come to lie tight against each other. A locating element with an external thread serves as a press member, which in finely adjustable manner presses in a direction perpendicular to the piezo element or impact plate. Due to the fact that the plate-shaped components of the sensor element are disposed pressed together, grain frequencies of the seed can be detected above 10 kHz.

Object of the present invention is to provide a method and apparatus for controlling mass particles to be distributed in a seed drill, so that application of seed during a sowing process is achieved in a simple and precise way.

To achieve the object, the invention is characterized in that a correction factor is constantly determined as the ratio of actual output quantity and actual rotational frequency, that the target application rate is converted with the aid of the calibration factor and the correction factor into a target rotation frequency dispensing device, that a controller of the control device determines the correcting variable acting on the dispensing device as a function of a control deviation, wherein the control deviation is determined as the difference between the target rotational frequency and a rotational frequency of the actual metering device.

The particular advantage of the method is that a robust and compact control is provided which enables precise dispensing of mass particles. Basis for accurate control is the measurement of the actually output mass particles by means of a sensor device that detects all output mass particles. According to the invention, the control is based on a single setpoint or target value, the setpoint is preferably expressed in the unit of mass particles per time. In a sowing machine, the invention permits a simple determination of both a longitudinal and a transverse distribution of the seed.

According to a preferred embodiment of the invention, a converter and/or amplifier unit is provided, by means of which the desired application rate is converted to an adjusted command variable for the controller. Further, the converter and/or amplifier unit is provided with a calibration factor for setting an initial value of a desired rotation rate at the beginning of a sowing process as well as a correction factor for correcting the calibration factor that can be applied during the sowing process. Advantageously, the metering device can be controlled with a dosing speed adapted to the type of seed. In the case of a seed change during the sowing process a correcting variable acting on the metering control is entered automatically in the appropriate output range.

According to another embodiment, the actual application rate is measured by counting mass particle pulses in the sensor device, wherein a measured time interval between the mass particle pulses and/or by comparing a number of counted mass particles per unit time a measure of the distribution accuracy in direction of travel of the seed drill is provided. Advantageously thereby a qualitatively statement for the longitudinal distribution of a seed can be made.

To achieve the object, the device according to the invention is characterized in that exclusively the desired application rate of the mass particles is fed to the control device as an input.

The particular advantage of the device according to the invention is that, with the inventive control structure, the target application rate can be done with only a single input variable. This leads to a simple and robust control circuit.

In a further development of the inventive device, the control device has a converter and/or amplifier unit, with which the target application rate is converted into a reference variable adapted to the controller.

Further advantages of the invention can be seen from the further subclaims. Embodiments of the invention will be explained in more detail with reference to the drawings.

There is shown in:

FIG. 3 a representation of an adjustment process when changing from a first seed to a second seed, FIG. 4 an enlarged cross-section of an angular pipe section, in which, for ease of illustration, components of a sensor element arranged in the corner region are represented side-by-side in exploded view, and FIG. 5 a schematic front view of the components of the sensor element.

Figure 1:
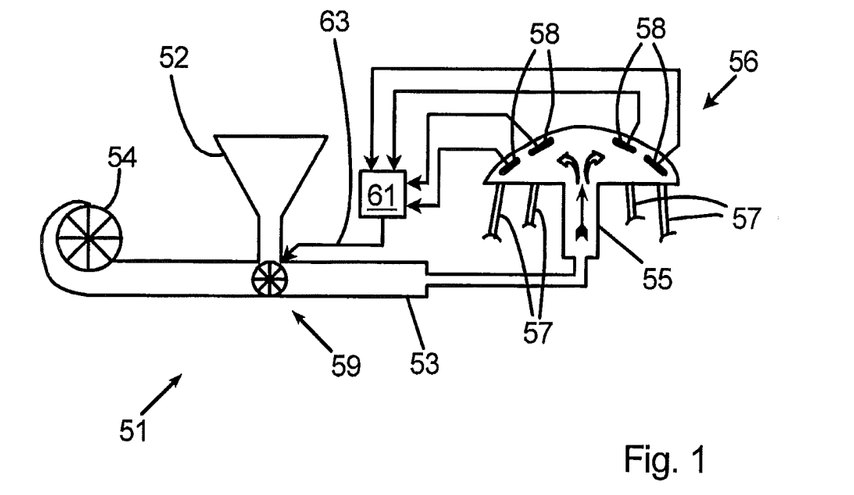
FIG. 1 a schematic representation of a seed drill.

The device for control of the mass particles to be distributed is preferably arranged integrated in a seeder or seed drill 51, wherein the seed drill 51 delivers seed grains formed as a mass particles in accordance with a predetermined desired or target distribution rate. Alternatively, the mass particles can also be applied as a granular fertilizer or pesticides, for example, by means of a pneumatic spreader. The seed drill 51 has a seed storage 52, in which the seed grains are stored. Furthermore, the seed drill 51 has a conduit or pipe 53 which is connected to a blower 54. The blower 54 generates an air stream in the pipe 53, which via a connection of the seed storage 52 entrains the grains of the seed and via a riser pipe 55 supplies a distribution means 56 (distribution head or feeder) at which the seed grains are distributed to multiple distribution lines 57 in the direction of distribution element (sowing shares). By means of a sensor device 58, the grains supplied via the riser pipe 55 are detected. The sensor device 58 (sensor) is arranged preferably integrated in the distribution device 56. Alternatively, the sensor device 58 can be arranged in at least one distribution line 57, in the vicinity of the distribution device 56, or close to the sowing elements (sowing shares). It is described in more detail later.

Furthermore, a metering device is provided which can be configured as dosing device 59, by means of which the mass particles are quantitatively added to the air stream in pipe 53. Alternatively or additionally, actuators or regulating units in the distribution lines 57 can, for example, by changing the cross section of the distribution line 57, control the quantitative supply of the seeds in the distribution lines. By both of these mentioned measures the flow of the mass particles or, as the case may be, the seeds, can be changed, so that with a corresponding actuation of the actuators, the application rate of the mass particles can be controlled. In addition, a speed of the blower 54 can be changed or controlled to adjust the air flow rate to an optimum value.

In the present embodiment, the metering device has a dispenser or dosing device 59 which is arranged on the pipe 53 in the region of connection to the seed storage 52. The metering device has servomotor 60 associated with the dosing device 59, which drives a dispensing wheel, wherein with increasing speed of the adjusting or servomotor 60 the feed rate of the seed in the pipe 53 increases.

A regulating or control device 61 is connected on the one hand to the sensor device 58 (sensor) and on the other hand to the servo motor 60 of the dosing device 59. The sensor device 58 determines the actual application amount value 62 of seed as a unit of grains per time. The control device 61 generates a control variable 63, which is transmitted to the input of the servomotor 60. The design of the controller for the seed grains to be applied is shown in detail in FIG. 2.

Figure 2:
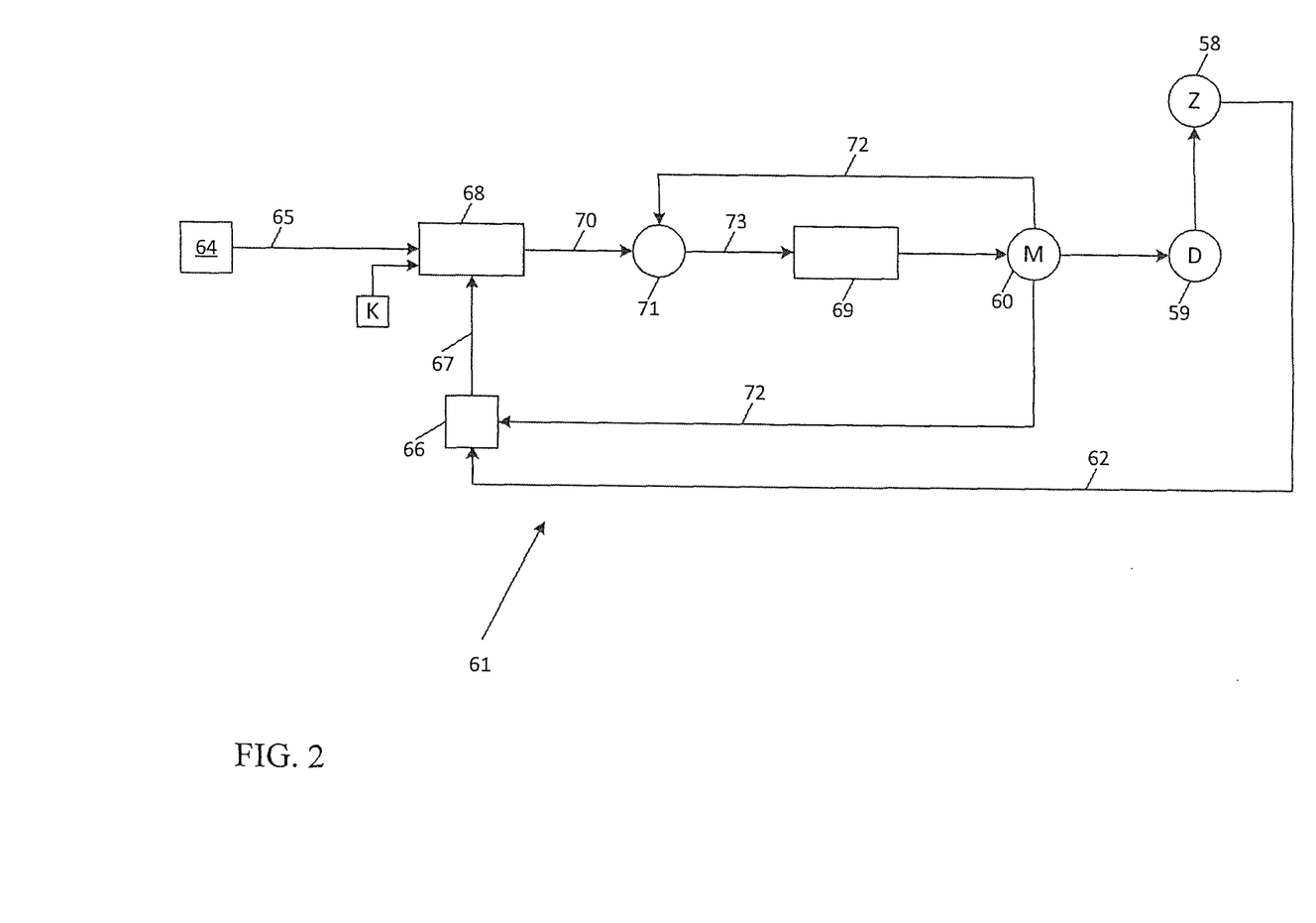
FIG. 2 a block diagram of a control device.

The control device 61 comprises a setpoint generator or speed control unit 64, which generates a target spray rate 65 of seed grains. In the setpoint generator 64 parameters of the speed of the seed drill and the working width can be incorporated. The setpoint generator 64 sets the target application rate 65 in the unit of grains per time. The target application rate 65 is applied to the input of a converter and/or amplifier unit 68. In addition, a calibration factor K is included in the converter and/or an amplifier unit 68 for setting a start value of a desired rotational frequency 70 or, as the case may be, desired application rate for the start of sowing process. In addition, the converter and/or amplifier unit 68 is supplied with a correction factor 67, which during the sowing process is calculated from the ratio of actual application amount signal 62 and the actual rotational frequency 72. In the converter and/or amplifier unit 68, the target rotational frequency 70 for the speed control 69 is formed from the target application rate 65, the calibration factor K and the correction factor 67. The converter and/or amplifier unit 68 generates the target rotational frequency 70, which is delivered to a comparator 71. The target rotational frequency 70 corresponds to a value in units of revolutions per time. To the comparator 71 the actual rotational frequency 72 (the actual frequency) of the servomotor 66 is also applied. From the comparison or, as the case may be, difference between the target rotational frequency 70 and the actual rotational frequency 72 a control deviation 73 is calculated and is applied as an input to the controller 69. The controller 69 may be a PI controller or a P controller. If necessary, it may also have a smoothing module for smoothing the target rotational frequency 70 if a strongly fluctuating actual application rate is determined during short time periods. The controller 69 then sends the control value 63 to the servo motor 66, which enables the metering of the seed grains.

Figure 3:
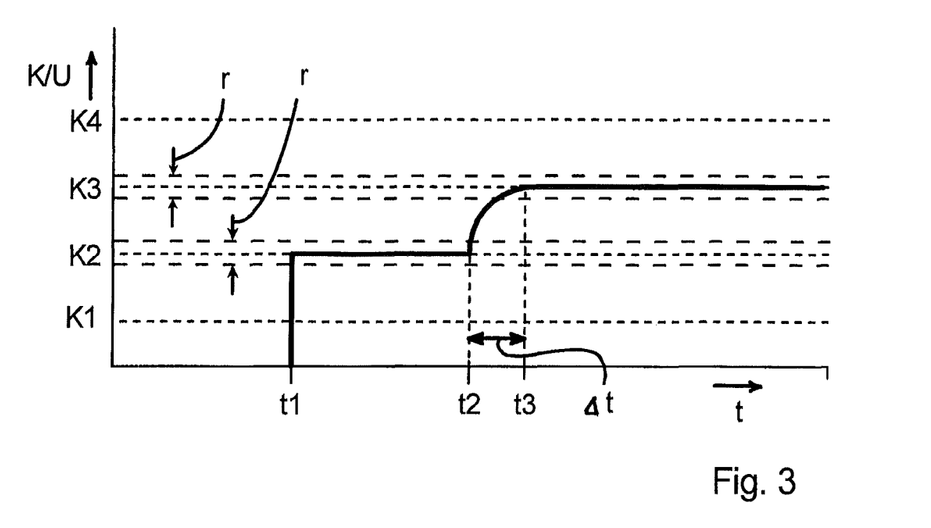

Seed-dependent calibration factors are shown in FIG. 3. The calibration factor for the seed "rape" corresponds to calibration factor K1. The calibration factor for the seed "barley" corresponds to calibration factor K2. The calibration factor for the seed "wheat" corresponds to calibration factor K3 and the calibration factor for the seed "rye" corresponds to calibration factor K4. If at the beginning of the sowing process the seed "barley" is to be applied, the calibration factor K2 would be elected in advance using a not-shown control panel. In the control device 61 the corresponding calibration factor K2 is input in the converter and/or amplifier unit 68, so that at the start of the sowing process the target rotational frequency 70 lies in the vicinity within a control range of r. This control range r can lie +/−10 to +/−20 percent with reference to a mean value or, as the case may be, a predetermined calibration factor K1, K2, K3, K4. During the further sowing process the deviations from the setpoint are compensated by means of the control device.

In the graph of FIG. 3, these deviations are not shown, or are not visible, due to scaling. If the seed output is changed, for example from the seed "barley" to the seed "wheat", with which comparatively more grains are applied per revolution of the metering device 59, there takes place within a settling time Δt a change in the actual application rate. The control according to the invention thus allows not only the controlling of the spread rate for one given seed type, but also for several different types of seed grains.

According to a not shown alternative embodiment of the invention the application rate of the mass particles can alternatively, or additionally, take place by varying the cross-section of the respective distribution lines 57. The distribution lines 57 may each be varied in cross section by means of an actuator, so that the application rate of the mass particles can be controlled depending on each distribution line 57. In this way, a uniform distribution of mass particles can be achieved over all distribution lines. Alternatively, the control of different application rates per distribution line or share is possible.

In addition to the two described possible embodiments, with the aid of the signals from the sensor device 58 a control of the fan motor 54 and the air volume flow generated thereby may take place, with the aim to adjust the air flow volume in the riser pipe 55 and in the distribution lines 57 to an optimum value.

Hereinafter, the sensor device 58 will be described in greater detail with reference to FIGS. 4 and 5. The sensor device 58 has a plurality of sensor elements 3, which are respectively associated with different distribution pipes 57. The sensor elements 3 are arranged in the distributor 56 in a pipe section 1, in which the mass particles (seed grains) to be counted are entrained in the air stream in the flow direction S. The line or conduit section may be formed as a rigid or as a flexible hose pipe.

The feed section 31 and/or the downstream transfer section 32 is connected, on a side opposite from the direction changing portion 2, with a not-shown straight pipe section of constant diameter.

The pipe section 1 is arranged angularly, wherein the air current is deflected at the deflection portion 2 from the feed section 31 toward the downstream transfer section 32 at an obtuse angle φ. The sensor element 3 is disposed on an outer portion 5 of the deflection portion 2. Components of the sensor element 3 are disposed in a bore in the throat portion 6 of the deflection portion 2, wherein the bore in the throat 6 projects in an outer corner area of the same transversely in the pipe section 1.

The sensor element 3 is preferably mounted by means of a screw connection to the deflection section 2 of the pipe 1. The bore in the throat 6 comprises a stop 7 in a root region, to which a preferably disk-shaped impact plate 8 of the sensor element 3 comes into abutment. In the assembled condition, the impact plate 8 forms an inner wall of the line section. Adjacent to the first impact plate 8 a disc-shaped piezoelectric element 9 is arranged, onto which a damping body 10 and a disk-shaped contact disk 11 adjoin. The impact plate 8, the piezoelectric element 9, the damping body 10 and the contact disk 11 are disposed in the bore throat 6. As a closing element, a securing element 12 with a female thread is placed externally on the throat of the bore 6, wherein it is in threaded engagement with an external thread 13 of the bore throat 6.

As the terminal end of the sensor element 3 there is, on the outer side, i.e., on a side facing away from the pipe 1, there is provided a locating or securing element 12 preferably in threaded engagement with the throat 6. The securing element 12 is formed bolt-shaped and can have an external thread which is in threaded engagement with an internally threaded bore throat 6. By screwing the securing element 12 in the bore throat 6, components 9, 10, 11 of the sensor element 3 which are arranged between the locating element 12 and the impact plate 8 are compressed or axially clamped, such that they are connected mechanically and/or electrically connected together in the mounting position. The securing element 12 when in the mounted position of the sensor element is preferably in a locked position.

The securing element 12 serves as a rigid base body which presses the subsequent components 8, 9, 10, 11 of the sensor element 3 in the mounting direction R. The securing element 12 may be formed for example as a threaded bolt, as shown in FIG. 4, or as a nut/cap.

The bore throat 6 has a constant diameter over its entire length, so that the components of the sensor element 3 to be pressed together, namely the impact plate 8, the piezoelectric element 9, the damping body 10 and the contact disk 11 can be inserted with close tolerance so that adjacent components the sensor element 3 lie flush against each other in the assembled condition. The components of the sensor element to be clamped 3 each have a same outer diameter, so that they can be used with close fit in the bore throat 6. The bore throat 6 has therefore an inside diameter which is slightly larger than an outer diameter of the components 8, 9, 10, 11 of the sensor element 3 to be clamped.

For providing an electrical connection for the piezoelectric element 9, without affecting the measuring result, the damping body 10 is preferably made of a resilient or flexible or rubber-like material. Essentially only the conductive particles in this material are not flexible but rigid. The damping body 10 is disc-shaped and has a central first connecting element 14, which consists of an electrical conductive material and is circular in shape. Radially outwardly the first connecting element 14 adjoins a circular ring-shaped rubber member 15, which has a damping effect against the impact surface 8 and the piezoelectric element 9. At the same time, the rubber element 15 forms an electrical insulation between the first connecting element 14 and a radially outwardly adjacent annular second linking element 16 of the damping body 10, which consists of an electrically conductive material. The elements 14, 15, 16 extend substantially as a common elastic plate which exert a dampening effect on the piezo element.

The contact disk 11 has in the central region a circular first connecting element 17, which is comprised of an electrically conductive material. In the radial direction outwardly a ring-shaped insulating member 18 connects, which can be formed preferably rigid, but also can be formed yielding. In the radial direction close to the outside of insulating member 18 a second connecting element 19 attaches, which is ring-shaped and electrically conductive. On the side away from the interior of pipe section 1 the first connecting element 17 and the second connecting element 19 of the contact disc 11 are connected to electric supply lines, not shown, which are led via a through-opening 20 of the securing element 12 to the outside. The through-opening 20 may have an internal thread, so that the electrical supply line can be screwed into the securing element 12. The connection lines can be connected to a signal processing device, not shown, so that the pulse signals of the piezoelectric element 9 can be calculated for counting the impinging of the mass particles on the impact surface 8. With respect to the structure of the signal processing means, reference is made to DE 10 2009 051 942 A1, the disclosure of which is incorporated by reference into this application.

The first connecting element 14 of the damping body 10 preferably has a larger diameter $d_{D1}$ than a diameter $d_{K1}$ of the first connecting element 17 of the contact disk 11. The first connecting element 14 in the mounted position thus covers over the first connecting element 17 and allows a safe connection. For prevention of short circuits, the diameter $d_{K1}$ of the first connecting element 17 is smaller than the inner diameter of the linking element 16 of the damping body 10. An inner diameter of the second connecting element 19 of contact disk 11 is larger than the diameter $d_{D1}$ of the first connecting element 14 of the damping body 10, so that no short circuit can occur. A diameter $d_{D1}$ of the first connecting element 14 of the damping body 10 is smaller than an inner diameter of the second connecting element 22 of the piezoelectric element 9.

The impact plate 8, the piezoelectric element 9, the damping body 10 and the contact disk 11 each form inserts that are inserted into the bore throat 6 and arranged compressed in the assembled position. The outer diameter of all the insert parts, in FIG. 5 designated $d_{P2}$ (piezo element 9), $d_{D2}$ (damper plate) and $d_{K2}$ (contact disk 11), is adapted to the inner diameter of the bore throat 6. The inserts 8, 9, 10, 11 can be easily inserted for assembly without tilting and virtually without requiring fitting.

In the present embodiment, an outer diameter $d_{K2}$ of the second connecting element 19 is equal to an outer diameter $d_{D2}$ of the second linking element 16. Further, the inner diameter $d_{K2}$ of the second connecting element 19 is equal to an inner diameter $d_{D2}$ of the second linking element 16. The second linking element 16 and the second connecting element 19 have thus the same radial extent. Since the components of the sensor element 3, namely, the piezoelectric element 9, the damping body 10 and the contact disk 11 are coaxially arranged to each other, the second linking element 16 and the second connecting element 19 of the contact disk 11 overlap.

The piezoelectric element 9 has, on the side facing away from the inside of the pipe section 1, a preferably circular first connection member 21 having a diameter $d_{P1}$ and an, in the radial direction, adjoining second connecting element 22 having a diameter $d_{P2}$, which is circular. The two connecting elements 21, 22 are of course arranged with an insulating ring at their interface, not shown, electrically insulating them from each other. The second connecting element 22 lies, in the assembled state, in electrically conductive manner against the second linking element 16 of the damping disk 10.

The diameter $d_{D1}$ of the connecting element 14 and the diameter of the $d_{K1}$ of the contact disk 11 are respectively smaller than the diameter $d_{P1}$ of the first connecting element 21 of the piezoelectric element 9.

The rubber member 15 forms such a radial clearance between the first linking element 14 and the second linking element 16 so that the first linking element 14 can not come into contact with the second connecting element 22 of the piezoelectric element 9. For example, counter to the mounting direction R, the inner contacting surfaces or connection surfaces of the inserts 9, 10, 11 may be formed in reduced layers. It creates a reliable insulation with the lowest possible contact resistance. By flat surface contact of the connecting elements 17, 19, 21, 22 or connecting or linking elements 14, 16 of the piezoelectric element 9, the support 10 and the damping assembly 11, an easy to assemble and operationally reliable electrical connection of the piezoelectric element 9 is provided to the outside.

Figure 4:
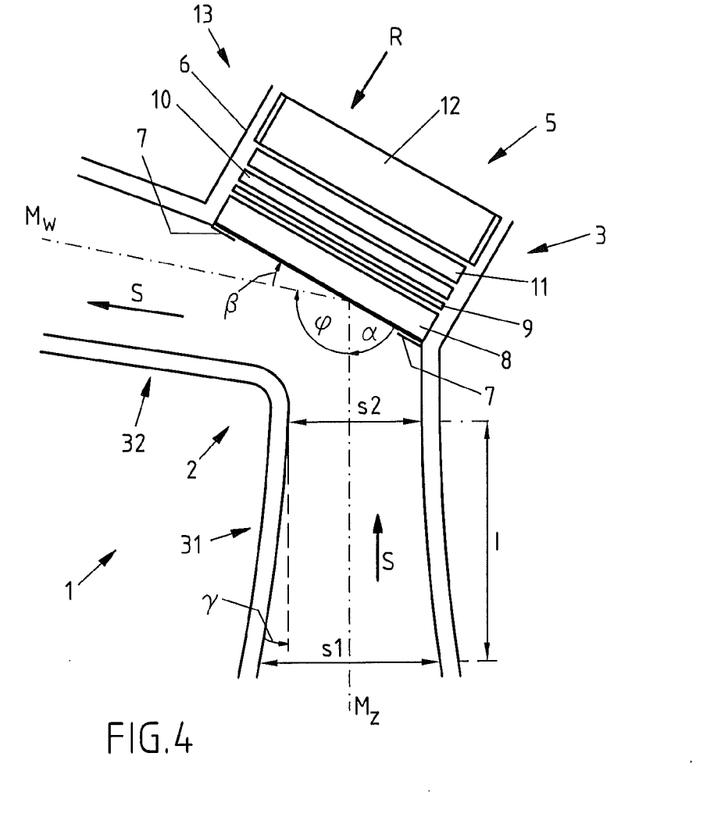
Figure 5:
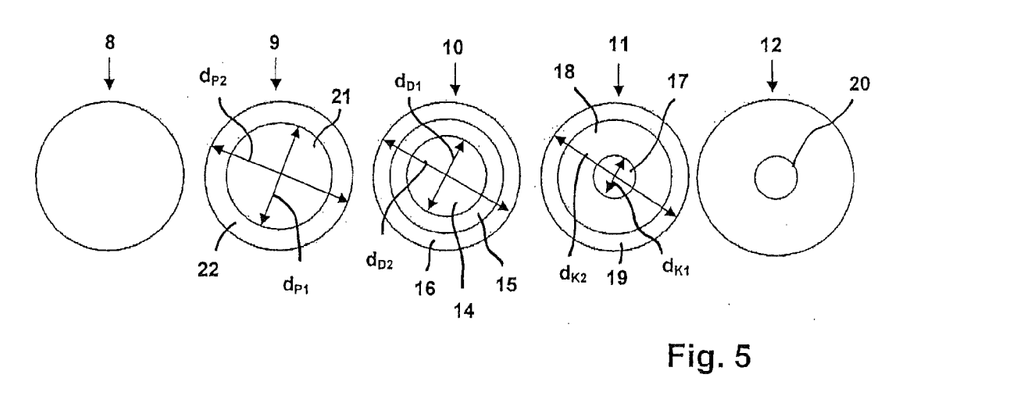

As can be seen particularly well in FIG. 4, the pipe section 1 is comprised of the feed section 31, the downstream transfer section 32, and between these is arranged deflecting section 2. The bore throat 6 is arranged in an outer region 5 of the angular deflection section 2 of the. The feed section 31 tapers in the direction of flow S. Preferably, the feed section 31 is cone shaped with a reduction in its cross-section in the flow direction S. Walls of the feed section 31 are shaped so that the mass particles or seeds guided in the flow of air impinge to the impact surface 8 at an increased speed in comparison with the straight line section speed. The impact surface 8 is preferably planar. A central axis $M_Z$ of the feed section 31 forms an acute angle α with the impact surface 8. A central axis $M_W$ of downstream transfer section 32 forms an acute angle β with the impact surface 8. The downstream transfer section 32 comprises, in the flow direction S, a constant diameter or preferably a diameter which increases in the flow direction S, so that pressure losses can be minimized.

By the tapered construction of the feed section 31, a targeted flow direction of the mass particles is effected in the direction of the impact plate 8, so that all the mass particles are detected only once by the sensor element 3. The tapered configuration of the feed section 31 effects in particular that the mass particles only impinge on the impact plate 8 within a certain angular range around angle α and are then diverted only in a certain range of angles around the exit angle β in the direction of downstream transfer section 32. A specific deflection of the mass particles containing air flow, the with an entry angle range and an exit angle range, produces a defined detection of the mass particles, without any mass particles moving past the impact plate 8 in the air flow.

According to a not shown alternative embodiment of the invention, the deflection angle φ between the feed section 31 and the downstream transfer section 32 can also be a right angle or an acute angle.

The feed section 31 tapers in the flow direction S over an axial length I, which may be in a range between 3 cm and 6 cm, from an inner diameter s1 of 30 mm to an inner diameter s2 of 20 mm. A taper angle γ is thus, at a length I of 3 cm, approximately 9°. Preferably, the feed section 31 is tapered so that the taper angle γ is in a range between 4° and 10°.

Preferably, the bore throat 6 is comprised of a resilient material. And the further part of the line section 1 including the feed section 31, the downstream transfer section 32 and the deflecting section 2 consists of a resilient plastic material. This advantageously prevents that structure-borne sound oscillations can propagate from the upstream main flow distributor in the direction of the piezoelectric element 9. It is thus virtually a vibration decoupling of the piezoelectric element 9 or the impact plate 8 relative to the line section 1.

The invention claimed is:

1. A device for detecting mass particles carried in air streams, in particular seeds to be distributed in a seed drill, comprising a pipe through which the air stream containing the mass particles is guided, with a sensor element arranged on the pipe, the sensor element comprising a piezo-element, an impact plate arranged on the side of the piezoelectric element facing the inside of the pipe a damping body arranged on the side of the piezoelectric element facing away from the inside of the pipe, and a rigid base body or securing element disposed on the side of the piezoelectric element facing away from the inside of the pipe, wherein between the damping body (10) and the rigid base body or securing element (12) a contact disk (11) is arranged having a first connecting element (17) and a second connecting element (19) at a radial distance to the first connecting element, and wherein the damping body (10) is designed as a damping disc, having electrical connecting elements (14, 16) spaced-apart from one another in the radial direction, wherein, on the one hand, a first connecting element (14) electrically connects only the first connecting surface (17) of the contact disk (11) with a first connecting element (21) of the piezo element (9), and on the other hand, a second connecting element (16) of the damping plate electrically connects only the second connecting element (19) of the contact disk (11) to the second connecting element (22) of the piezo element (9).

2. The device according to claim 1, wherein on the one hand the first connecting element (17, 21) of the contact disk (11) or the piezoelectric element (9) and the first connecting element (14) of the damping body (10) is circular, and on the other hand the second connecting element (19, 22) of the contact disk (11) or the piezoelectric element (9) and the second connecting portion (16) of the damping body (10) is circular.

3. The device according to claim 1, wherein a diameter ($d_{K1}$) of the first connecting element (17) is smaller than an inner diameter of the second connecting element (16) of the damping body (10), and wherein a diameter ($d_{D1}$) of the first connecting element (14) of the damping body (10) is smaller than an inner diameter of the second connecting element (22) of the piezoelectric element (9).

4. The device according to claim 1, wherein an inner diameter of the second connecting element (19) of the contact disk (11) is greater than a diameter ($d_{D1}$) of the first connecting element (14) of the damping body (10) and the inner diameter of the is the second connecting element (16) of the damping body (10) is greater than the inner diameter of the second connecting element (22) of the piezo element (9).

5. The device according to claim 1, wherein the damping disc (10) is formed completely rubberized.

6. The device according to claim 1, wherein the sensor element arranged on the pipe is arranged in a bore with a bore throat (6), wherein the pipe has a downstream transfer section (32) and/or a deflection portion (2), and wherein the bore throat (6) and/or the feed section (31) and/or the downstream transfer section (32) and/or of the deflection portion (2) is formed resilient.

7. The device according to claim 1, wherein the sensor element (3) is disposed in a deflection section (2) of the pipe (1), and wherein an upstream arranged feed section (31) of the pipe (1) is tapered in the flow direction (S) such that substantially all the mass particles conveyed in the feed section (31) and to be detected impact once on the impact surface (8) of the sensor element (3).

8. The device according to claim 1, wherein the sensor element (3) is arranged in a deflection section (2) of the pipe (1) and wherein an outer region (5) of the deflection portion (2) has a bore throat (6), which can be brought into engagement with a securing element (12) via a threaded connection, so that in a locking position of the securing element (12) the piezoelectric element (9), the damping body (10) and the impact plate (8) are compressed in the bore throat (6) in the assembled position.

* * * * *